(12) United States Patent
Low et al.

(10) Patent No.: US 12,468,401 B2
(45) Date of Patent: Nov. 11, 2025

(54) WRIST REST AND SYSTEM

(71) Applicant: Razer (Asia-Pacific) Pte. Ltd., Singapore (SG)

(72) Inventors: Kok Kiong Low, Singapore (SG); Alvin Sim, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/689,102

(22) PCT Filed: Sep. 8, 2021

(86) PCT No.: PCT/SG2021/050541
§ 371 (c)(1),
(2) Date: Mar. 5, 2024

(87) PCT Pub. No.: WO2023/038569
PCT Pub. Date: Mar. 16, 2023

(65) Prior Publication Data
US 2025/0036209 A1    Jan. 30, 2025

(51) Int. Cl.
*G06F 3/039* (2013.01)
*F21V 8/00* (2006.01)
(Continued)

(52) U.S. Cl.
CPC ......... *G06F 3/0227* (2013.01); *G02B 6/0051* (2013.01); *G02B 6/0083* (2013.01);
(Continued)

(58) Field of Classification Search
CPC ...... G06F 3/0227; G06F 1/1632; G06F 3/039; G06F 2203/0384; G02B 6/0051; G02B 6/0083; G02B 6/0095
See application file for complete search history.

(56) References Cited

U.S. PATENT DOCUMENTS 5,621,299 A * 4/1997 Krall .................... H02J 7/0063
                                                              307/66
6,059,819 A    5/2000 Weder
(Continued)

FOREIGN PATENT DOCUMENTS

KR    20-0472686 Y1    5/2014
KR    10-1452358 B1    10/2014
(Continued)

OTHER PUBLICATIONS

International Search Report; dated May 30, 2022; application # PCT/SG2021/050541.
(Continued)

*Primary Examiner* — Afroza Chowdhury
(74) *Attorney, Agent, or Firm* — Polsinelli PC (57) ABSTRACT

According to various embodiments, a wrist rest is provided. The wrist rest comprises a base structure, a plurality of light sources housed in the base structure and capable of emitting light, a light guide disposed over the plurality of light sources and configured to receive the light emitted from the plurality of light sources and release the light, and a cushion secured to the base structure and disposed over the light guide in a manner so as to conceal the plurality of light sources and the light guide between the base structure and the cushion. The cushion is configured to diffuse the light released from the light guide. Each light source is capable of selectively producing a plurality of lighting colours.

18 Claims, 6 Drawing Sheets

(51) Int. Cl.
*G06F 1/16* (2006.01)
*G06F 3/02* (2006.01)
(52) U.S. Cl.
CPC ......... *G02B 6/0095* (2013.01); *G06F 1/1632* (2013.01); *G06F 3/039* (2013.01); *G06F 2203/0384* (2013.01)

(56) References Cited

U.S. PATENT DOCUMENTS

| | | | |
|---|---|---|---|
| 6,089,516 A * | 7/2000 | Yates | G06F 3/039 248/118.1 |
| 9,413,457 B2 | 8/2016 | Pederson et al. | |
| 10,969,880 B1 | 4/2021 | Lin | |
| 2004/0201573 A1 | 10/2004 | Yu et al. | |
| 2004/0265546 A1 | 12/2004 | Brophy | |
| 2005/0098689 A1 | 5/2005 | Sykes | |
| 2007/0001066 A1 | 1/2007 | Lane | |
| 2007/0007399 A1 * | 1/2007 | Cheng | G06F 3/039 248/118.1 |
| 2008/0023597 A1 | 1/2008 | Wyner et al. | |
| 2011/0071601 A1 * | 3/2011 | Schneider | A61N 5/0613 607/88 |
| 2011/0309212 A1 | 12/2011 | Guerrieri et al. | |
| 2018/0224953 A1 | 8/2018 | Chou | |

FOREIGN PATENT DOCUMENTS

| | | |
|---|---|---|
| KR | 20-2019-0000703 U | 3/2019 |
| TW | M580716 U | 7/2019 |
| WO | 9924888 A1 | 5/1999 |

OTHER PUBLICATIONS

International Search Report; dated Oct. 4, 2024; Application # 21956923.3.
Best Wrist Rest for 60% Keyboards (https://computerstationnation.com/best-wristrest- for-60-keyboards/ ).
Self-charging Peripherals with inbuilt Power Harvesting System (https://iopscience.iop.org/article/10.1088/1757-899X/872/1/012036/pdf).

* cited by examiner

WRIST REST AND SYSTEM

TECHNICAL FIELD

Various embodiments relate to a wrist rest and a system.

BACKGROUND

Input devices such as a keyboard, a key pad, a mouse, a gamepad, a joystick, etc. are widely used to operate an electronic device such as a desktop computer or a laptop computer. Such input devices have a certain height with respect to a floor surface. Thus, a user may need to continuously lift the wrist in order to press keys or buttons on the input devices. The user may feel wrist pains due to the uncomfortable posture of the wrist in the course of using the input devices.

In recent years, to prevent the wrist from being injured or tired, various types of wrist rests have been provided. The wrist rests may provide comfort and support for the wrist of the user who is using the input device. For example, the wrist rests may be removably attached to a front edge of the keyboard or the keypad or may be placed adjacent to the mouse, the gamepad or the joystick. The wrist rests may include a cushion where the user can rest the wrist on while using the input devices.

SUMMARY

According to various embodiments, a wrist rest is provided. The wrist rest may comprise a base structure, a plurality of light sources housed in the base structure and capable of emitting light, a light guide disposed over the plurality of light sources and configured to receive the light emitted from the plurality of light sources and release the light, and a cushion secured to the base structure and disposed over the light guide in a manner so as to conceal the plurality of light sources and the light guide between the base structure and the cushion. The cushion may be configured to diffuse the light released from the light guide. Each light source may be capable of selectively producing a plurality of lighting colours.

According to various embodiments, a system comprising a wrist rest and an electronic device may be provided. The wrist rest may comprise a base structure, a plurality of light sources housed in the base structure and capable of emitting light, a light guide disposed over the plurality of light sources and configured to receive the light emitted from the plurality of light sources and release the light, and a cushion secured to the base structure and disposed over the light guide in a manner so as to conceal the plurality of light sources and the light guide between the base structure and the cushion. The cushion may be configured to diffuse the light released from the light guide. The electronic device may be capable of communicating with the wrist rest and operable to transmit a wireless signal comprising information about a lighting profile to the wrist rest. Each light source may be capable of selectively producing a plurality of lighting colours.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the wrist rest are analogously valid for the system, and vice versa. Furthermore, it will be understood that the embodiments described below may be combined, for example, a part of one embodiment may be combined with a part of another embodiment.

It will be understood that any property described herein for a specific device may also hold for any device described herein. Furthermore, it will be understood that for any device described herein, not necessarily all the components described must be enclosed in the device, but only some (but not all) components may be enclosed.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, structure or any part of any device or structure. In addition, the singular terms "a", "an", and "the" include plural references unless context clearly indicates otherwise. Similarly, the word "or" is intended to include "and" unless the context clearly indicates otherwise.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, various embodiments will now be described by way of examples and not limitations, and with reference to the figures.

According to various embodiments, a wrist rest may be provided. The wrist rest may comprise a plurality of light sources capable of selectively producing a plurality of lighting colours. According to various embodiments, the wrist rest may be configured to provide comfort and support for a wrist of a user who is using an input device such as a keyboard, a key pad, a mouse, a gamepad, a joystick, etc. According to various embodiments, the wrist rest may also be referred to as a wrist cushion, a wrist pad, a wrist padding, or a wrist support. A conventional wrist rest may merely provide the cushioning function for the wrist. In contrast, the wrist rest according to various embodiments additionally includes a lighting function provided by a plurality of light sources that may be driven according to one or more lighting profiles.

In various embodiments, the plurality of light sources may be housed in a base structure and concealed by a cushion. Each light source may selectively produce the plurality of lighting colours, and the cushion may diffuse the light produced by the plurality of light sources. Therefore, the wrist rest according to various embodiments may relieve the monotony led by the conventional wrist rest and provide the user with refined and enhanced user experiences without changing the exterior of the conventional wrist rest.

Figure 1:
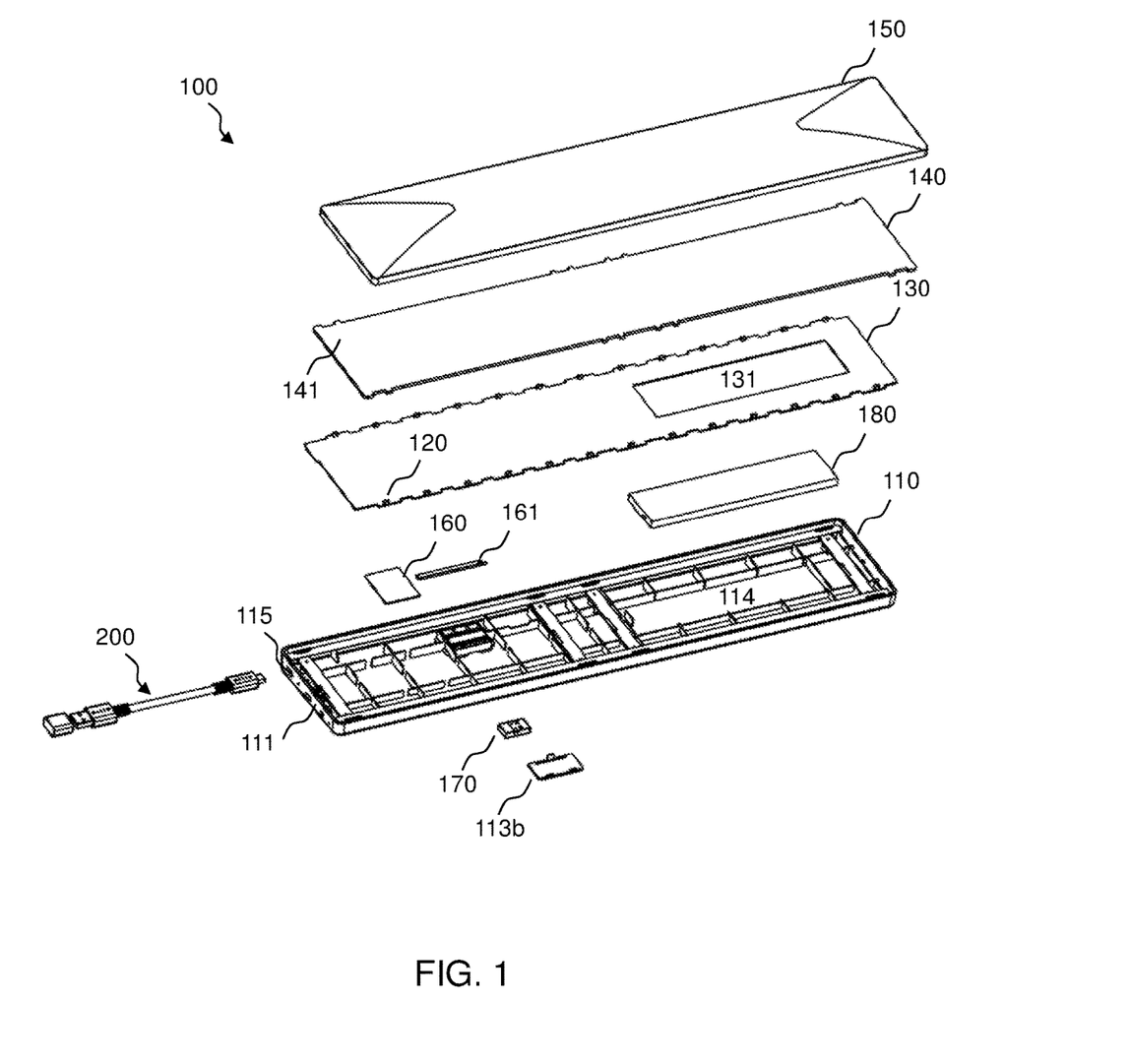
FIG. 1 shows a front exploded view of a wrist rest according to various embodiments.
Figure 2:
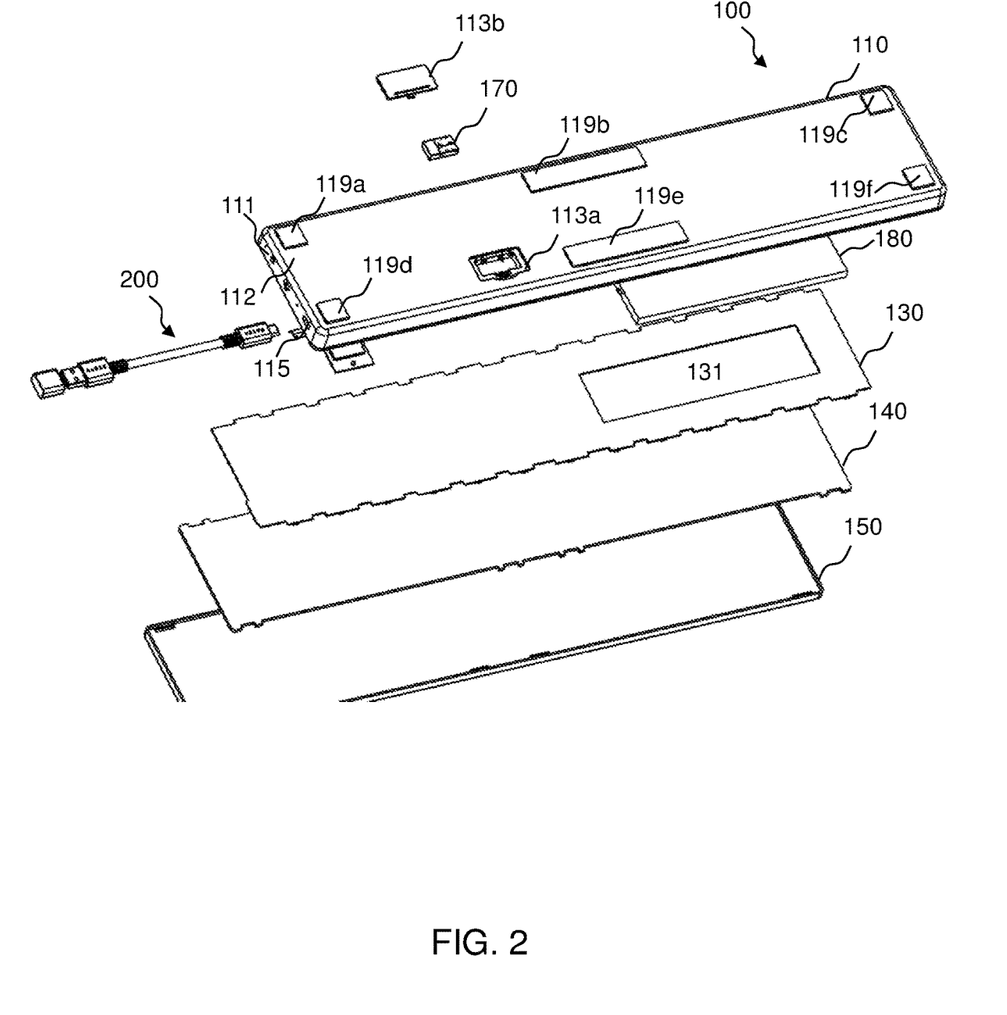
FIG. 2 shows a rear exploded view of the wrist rest according to various embodiments.

FIG. 1 shows a front exploded view of a wrist rest 100 according to various embodiments. FIG. 2 shows a rear exploded view of the wrist rest 100 according to various embodiments.

Although not shown in FIG. 1 and FIG. 2, the wrist rest 100 may be removably attached to a front edge of an input device such as a keyboard or a keypad (from the point of view of the user when the wrist rest 100 is in use) or may be placed adjacent to an input device such as a mouse, a gamepad or a joystick.

Referring to FIG. 1 and FIG. 2, the wrist rest 100 may include a base structure 110. The base structure 110 may be a bottom housing, a bottom casing, or a bottom exterior structure of the wrist rest 100. As shown in FIG. 2, the base structure 110 may include a bottom side 112 (also referred to as "floor portion") (from the point of view of the user when the wrist rest 100 is in use). The base structure 110 may include one or more side walls 111 extending upwardly from the bottom side 112 of the base structure 110 at one or more corresponding edges of the bottom side 112 of the base structure 110. For example, as shown in FIG. 1 and FIG. 2, the base structure 110 may include four (4) side walls 111 extending upwardly from the bottom side 112 of the base structure 110 at four (4) corresponding edges of the bottom side 112 of the base structure 110. The base structure 110 may be of an elongate shape. Accordingly, the bottom side 112 of the base structure 110 may be of an elongate panel-like shape.

As shown in FIG. 1, the wrist rest 100 may further include a plurality of light sources 120. The plurality of light sources 120 may be housed in the base structure 110. The plurality of light sources 120 may be capable of emitting light. According to various embodiments, each light source 120 may be capable of selectively producing a plurality of lighting colours. Each light source 120 may be configured to produce the light in various lighting colours, for example, including red, green, blue, or any combinations thereof. Accordingly, the wrist rest 100 according to various embodiments may provide the user with refined and enhanced user experiences by producing a variety of lighting colours.

As shown in FIG. 1 and FIG. 2, the wrist rest 100 may further include a circuit board 130. The circuit board 130 may be housed in the base structure 110. The plurality of light sources 120 may be mounted on the circuit board 130. The circuit board 130 may be configured to mechanically support and electrically connect a plurality of electronic components including the plurality of light sources 120. In some embodiments, the circuit board 130 may be a printed circuit board (PCB), for example, an aluminium PCB.

As shown in FIG. 1 and FIG. 2, the wrist rest 100 may further include a light guide 140. The light guide 140 may be housed in the base structure 110. As shown in FIG. 1, the light guide 140 may be disposed over the plurality of light sources 120. The light guide 140 may be configured to receive the light emitted from the plurality of light sources 120 and release the light. In some embodiments, the material composition of the light guide 140 may include, but not be limited to, optical grade polymethyl methacrylate (PMMA), polycarbonate (PC) or transparent acrylonitrile butadiene styrene (ABS).

As shown in FIG. 1 and FIG. 2, the wrist rest 100 may further include a cushion 150. The cushion 150 may be configured for the user to rest the wrist on. The cushion 150 may be made of a material which can provide comfort and support for the wrist of the user. For example, the cushion 150 may be made of a soft gel which is a semi-solid material. In another example embodiment, the cushion 150 may be made of a hard translucent plastic. In some embodiments, the cushion 150 may be made of a translucent material, for example, a translucent soft gel, such that a part of the light released from the light guide 140 passes the cushion 150 and the other part of the light released from the light guide 140 is reflected by the cushion 150. In some embodiments, light transmittance of the translucent material may be fine-tuned, for example, until the material does not have hot spot(s) and yet allows the light to pass through the material in a diffused manner. For example, light diffusion powder may be added to a transparent material to adjust the light transmittance. While it is preferable for the cushion 150 to be translucent, in alternative embodiments, the cushion 150 may be transparent.

The cushion 150 may be configured to diffuse the light released from the light guide 140. The cushion 150 may be disposed adjacent to the light guide 140. In some embodiments, the cushion 150 may be disposed adjacent to a front surface 141 of the light guide 140. The cushion 150 may be configured to diffuse the light released from the front surface 141 of the light guide 140. The cushion 150 may smoothen the appearance of the light released from the light guide 140, such that the diffused light appears to be emitted at least substantially uniformly.

The cushion 150 may be configured to be disposed over the light guide 140 in a manner so as to conceal the plurality of light sources 120, the circuit board 130 and the light guide 140 between the base structure 110 and the cushion 150. The cushion 150 may be configured to be secured to the base structure 110. Hence, the lighting components including the plurality of light sources 120, the circuit board 130 and the light guide 140 may be contained within the internal space of the wrist rest 100 as defined by the cushion 150 and the base structure 110, such that the lighting components may be enclosed inside the wrist rest 100. Accordingly, the wrist rest 100 according to various embodiments may provide the user with lighting effects without changing the exterior of the wrist rest 100.

Figure 8:
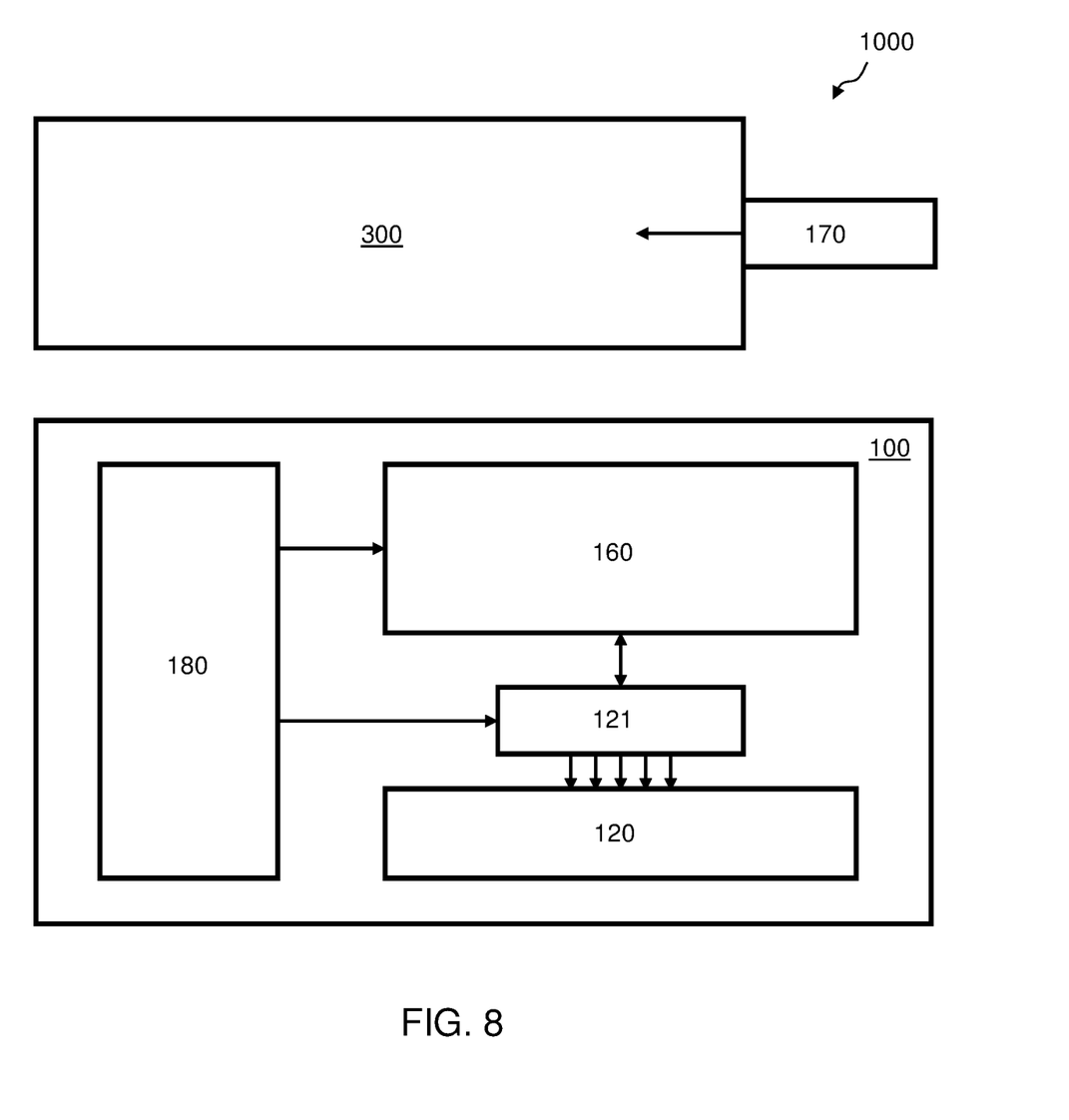
FIG. 8 shows a block diagram of a system according to various embodiments.

Although not shown in FIG. 1 and FIG. 2, the wrist rest 100 may further include a controller 121 (see, for example, FIG. 8). The controller 121 may be housed in the base structure 110. In some embodiments, the controller 121 may be mounted on the circuit board 130 and connected to the plurality of light sources 120. In some other embodiments, the controller 121 may be disposed adjacent to the circuit board 130 and connected to the circuit board 130 and the plurality of light sources 120. The controller 121 may be operable to control each light source 120 to produce at least one predetermined lighting colour among the plurality of lighting colours based on a predetermined lighting profile. In some embodiments, the controller 121 may be one or more LED drivers which is/are operable to control the plurality of light sources 120, for example LEDs. In some other embodiments, the controller 121 may be a processor which is operable to control the plurality of light sources 120. In some other embodiments, the controller 121 may be a combination of the LED drivers and the processor which is operable to control the plurality of light sources 120, for example LEDs.

As shown in FIG. 1, the wrist rest 100 may further include a communication module 160. The communication module 160 may be housed in the base structure 110. In some embodiments, the communication module 160 may be mounted on the circuit board 130. For example, the communication module 160 may be mounted on a bottom side (from the point of view of the user when the wrist rest 100 is in use) of the circuit board 130. In some other embodiments, the communication module 160 may be disposed between the circuit board 130 and the base structure 110 and connected to the circuit board 130. As shown in FIG. 1, the wrist rest 100 may further include an antenna 161. In some embodiments, the communication module 160 may incorporate the antenna 161 for communication. For example, the communication module 160 may be an RF (radio-frequency) module. The communication module 160 may be operable to transmit and/or receive wireless signals between the wrist rest 110 and an external electronic device 300 (not shown in FIG. 1, see, e.g., FIG. 8) through a wireless communication, for example an RF communication. The electronic device 300 may include at least one of the following: a mobile phone, a tablet computer, a laptop computer, a desktop computer, a head-mounted display and a smart watch.

In some embodiments, the communication module 160 may be operable to receive a wireless signal comprising information about the lighting profile from the electronic device 300, and provide the information about the lighting profile to the controller 121. The controller 121 may receive the information about the lighting profile from the communication module 160, and control each light source 120 to produce at least one predetermined lighting colour among the plurality of lighting colours based on the lighting profile.

As shown in FIG. 1 and FIG. 2, the wrist rest 100 may further include a communication device 170. The communication device 170 may be housed in the base structure 110 (as will be described in further detail below with FIG. 6 and FIG. 7). The communication device 170 may be configured to be detachably couplable to the electronic device 300. In some embodiments, the communication device 170 may be detachably couplable to a port of the electronic device 300. The communication device 170 may be operable to communicatively connect the communication module 160 with the electronic device 300 through a wireless network, for example a 2.4 GHz wireless communications network or a Bluetooth communications network. For example, the communication device 170 may be a USB dongle including a USB connector at one end, and the port of the electronic device 300 may be a USB port compatible with the USB connector. The communication device 170 may provide wireless connection functionalities between the electronic device 300 and the wrist rest 100 while the USB connector of the communication device 170 is plugged into the USB port of the electronic device 300. The USB connector of the USB dongle and the USB port of the electronic device 300 may, for example, be a USB-A connector and a USB-A port, respectively, but are not limited thereto.

As shown in FIG. 1 and FIG. 2, the wrist rest 100 may further include a battery 180. The battery 180 may be housed in the base structure 110. The battery 180 may be operable to supply power to the plurality of light sources 120. In some embodiments, the circuit board 130 may comprise a cut-out 131, and the battery 180 may be configured to be inserted into the cut-out 131 to connect the battery 180 to the circuit board 130. To this end, the cut-out 131 may be dimensioned to match the battery 180. The cut-out 131 may have a shape corresponding to a shape of the battery 180. For example, the cut-out 131 may have a rectangular shape as shown in FIG. 1 and FIG. 2, but is not limited thereto. The base structure 110 may include a groove 114 corresponding to a shape of the battery 180 such that the battery 180 inserted into the cut-out 131 may be housed in the groove 114 of the base structure 110. Although not shown in FIG. 1 and FIG. 2, in some other embodiments, the battery 180 may be mounted on the circuit board 130. Although not shown in FIG. 1 and FIG. 2, in some other embodiments, the battery 180 may be disposed between the circuit board 130 and the base structure 110 and connected to the circuit board 130. As shown in FIG. 1 and FIG. 2, the base structure 110 of the wrist rest 100 may further include a port 115. The battery 180 may be re-chargeable, for example via the port 115. To this end, a power cable 200 may be plugged into the port 115 (as will be described in further detail below with FIG. 4 and FIG. 5).

Figure 3:
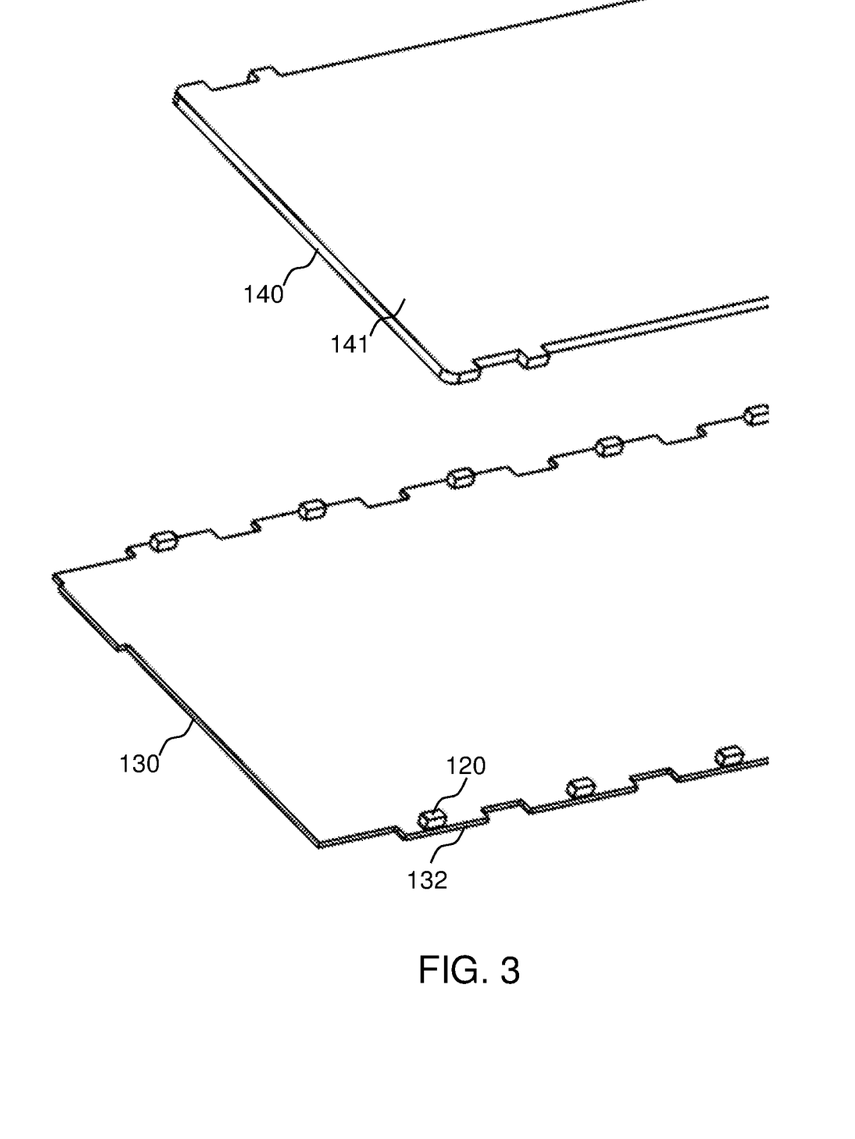
FIG. 3 shows an enlarged view of a circuit board and a light guide of the wrist rest according to various embodiments.

FIG. 3 shows an enlarged view of a circuit board 130 and a light guide 140 of the wrist rest 100 according to various embodiments.

As shown in FIGS. 1 to 3, the wrist rest 100 may include the plurality of light sources 120. The plurality of light sources 120 may be capable of emitting light. According to various embodiments, each light source 120 may be configured to produce the light in various lighting colours, for example, including red, green, blue, or any combinations thereof. In some embodiments, the plurality of light sources 120 may include red-green-blue light emitting diodes (RGB LEDs). In some other embodiments, each light source 120 may include a red LED, a green LED and a blue LED packaged into a single light source package. In some other embodiments, the plurality of light sources 120 may include a plurality of RGB LEDs and a plurality of light source packages.

As shown in FIGS. 1 to 3, the wrist rest 100 may further include the circuit board 130. The circuit board 130 may be configured to mechanically support and electrically connect a plurality of electronic components including the plurality of light sources 120. The plurality of light sources 120 may be mounted on the circuit board 130. In some embodiments, the plurality of light sources 120 may be arranged along two (2) elongated edges of the circuit board 130. For example, as shown in FIG. 3, the circuit board 130 may comprise a plurality of protrusions 132 along two (2) elongated edges of the circuit board 130, and each light source 120 may be arranged on a respective protrusion 132 to trap the light. As an example, the light sources 120 may have at least two (2) side walls, for example, a left side wall and a right side wall opposite to the left side wall (from the point of view of the user when the wrist rest 100 is in use), which may help to reflect the light back to the light guide 140. By way of example, the light sources 120 may emit light towards a center line that is in parallel to the two (2) elongated edges of the light guide 140. While FIG. 3 shows the light sources 120 arranged on the protrusions 132 of the circuit board 130, it may be appreciated that the light sources 120 may be arranged in any other manner. For example, the plurality of light sources 120 may be arranged at a central portion of the circuit board 130.

As shown in FIG. 3, the wrist rest 100 may further include the light guide 140. The light guide 140 may have the front surface 141 and a back surface opposite to the front surface 141 (from the point of view of the user when the wrist rest 100 is in use). In some embodiments, the light guide 140 may be disposed such that the front surface 141 may face the cushion 150 and the back surface may face the circuit board 130 with the plurality of light sources 120. Therefore, the back surface may receive the light emitted from the plurality of light sources 120 and the front surface 141 may release the received light. In some embodiments, the light guide 140 may be larger than an area of the circuit board 130 in which the plurality of light sources 120 are mounted.

In some embodiments, the circuit board 130 may be painted in a certain colour, for example, white colour, to function as a reflector to prevent the light from directing to the base structure 110. Alternatively or additionally, although not shown in FIG. 3, the wrist rest 100 may optionally include a reflector arranged between the light guide 140 and the circuit board 130 to prevent the light from directing to the base structure 110.

Figure 4:
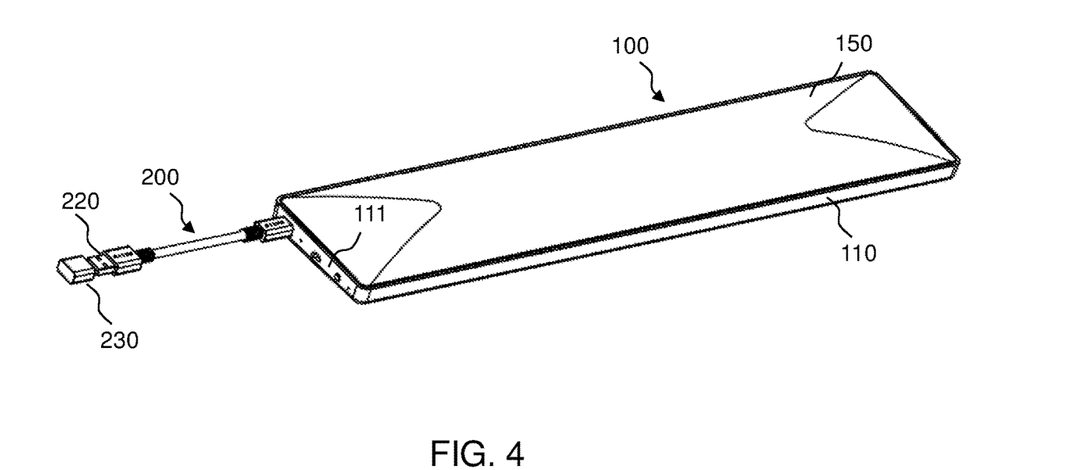
FIG. 4 shows a schematic diagram of a front perspective view of the wrist rest according to various embodiments.
Figure 5:
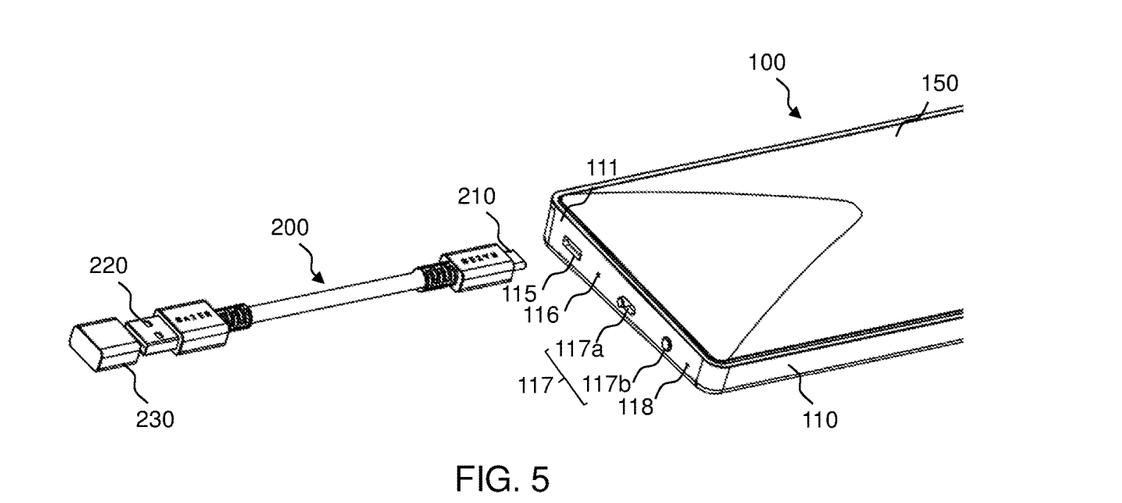
FIG. 5 shows a schematic diagram of an enlarged front perspective view of the wrist rest according to various embodiments.

FIG. 4 shows a schematic diagram of a front perspective view of the wrist rest 100 according to various embodiments. FIG. 5 shows a schematic diagram of an enlarged front perspective view of the wrist rest 100 according to various embodiments.

As shown in FIG. 4 and FIG. 5, according to various embodiments, the cushion 150 may be disposed over the light guide 140 in a manner so as to conceal the plurality of light sources 120, the circuit board 130 and the light guide 140 between the base structure 110 and the cushion 150. The cushion 150 may be secured to the base structure 110. For example, the cushion 150 may be fixedly attached to the base structure 110 using an adhesive or a glue. Therefore, the cushion 150 may be attached to the base structure 110 and may cover across the base structure 110 in a manner so as to enclose an internal space of the wrist rest 100.

As shown in FIG. 4 and FIG. 5, the base structure 110 of the wrist rest 100 may further include the port 115. The port 115 may be disposed on one of the side walls 111 of the base structure 110 (for example, on one of two shorter side walls of the base structure 110). While FIG. 4 and FIG. 5 show the port 115 being disposed on the one of the side walls 111 of the base structure 110, it may be appreciated that the port 115 may be provided on any other of the side walls 111 of the base structure 110 (for example, on one of two longer side walls of the base structure 110). The port 115 may be configured to allow a power cable 200 to be plugged therein to receive power from an external power source, for example the electronic device 300. For example, as shown in FIG. 4 and FIG. 5, the port 115 may be a USB-C port which is compatible with a USB-C connector (also known as "24-pin USB connector"). While FIG. 4 and FIG. 5 show the port 115 being the USB-C port, it may be appreciated that the port 115 may be any other types of ports, e.g., any other type of USB port.

As shown in FIG. 4 and FIG. 5, the power cable 200 may include two connectors, for example, a first connector 210) and a second connector 220. In some embodiments, the first connector 210 may be configured to be detachably couplable to the wrist rest 100 and the second connector 220 may be configured to be detachably couplable to the electronic device 300. For example, as shown in FIG. 4 and FIG. 5, the first connector 210 of the power cable 200 may be the USB-C connector and capable of being plugged into the port 115 of the wrist rest 100. The second connector 220 of the power cable 200 may be a USB-A connector and capable of being plugged into a USB-A port of the electronic device 300. While FIG. 4 and FIG. 5 show the first connector 210 and the second connector 220 being the USB-C connector and the USB-A connector respectively, it may be appreciated that the first connector 210 and the second connector 220 may be any other types of connectors, e.g., any other type of USB connectors.

As shown in FIG. 4 and FIG. 5, a cap 230 may be provided with the power cable 200. The cap 230 may be configured to detachably cover the second connector 220. Although not shown in FIG. 4 and FIG. 5, in some embodiments, another cap (hereinafter referred to as a "second cap") may be provided with the power cable 200. The second cap may be configured to detachably cover the first connector 210.

As shown in FIG. 4 and FIG. 5, the base structure 110 of the wrist rest 100 may further include a light source 116. For example, the light source 116 may be a light emitting diode (LED) configured to emit white light or a red-green-blue light emitting diode (RGB LED) configured to emit light in various colours. When the communication module 160 of the wrist rest 100 is communicatively connected to the electronic device 300 using the communication device 170 through the wireless network, the light source 116 may light up to notify the pairing connection. The light source 116 may be disposed on one of the side walls 111 of the base structure 110, for example on the same side wall where the port 115 is disposed. For example, the light source 116 may be disposed adjacent to the port 115. While FIG. 4 and FIG. 5 show the light source 116 being disposed on the one of the side walls 111 of the base structure 110, it may be appreciated that the light source 116 may be provided on any other of the side walls 111 of the base structure 110.

Although not shown in FIG. 4 and FIG. 5, the base structure 110 of the wrist rest 100 may further include another light source (hereinafter referred to as a "second light source"). For example, the second light source may be a light emitting diode (LED) configured to emit white light or a red-green-blue light emitting diode (RGB LED) configured to emit light in various colours. When the power is being supplied to the battery 180 via the power cable 200 plugged into the port 115, the second light source may light up to notify the powering. The second light source may be disposed on one of the side walls 111 of the base structure 110, for example on the same side wall where the port 115 is disposed. For example, the second light source may be disposed adjacent to the port 115.

In some other embodiments, the light source 116 may be operable to notify the pairing connection and the powering with different lighting colour and/or different lighting pattern. For example, the light source 116 may be operable to produce a first lighting colour when the communication module 160 of the wrist rest 100 is communicatively connected to the electronic device 300, and to produce a second lighting colour when the power is being supplied to the battery 180. As another example, the light source 116 may be operable to produce a blinking lighting when the communication module 160 of the wrist rest 100 is communicatively connected to the electronic device 300, and to produce a solid lighting when the power is being supplied to the battery 180.

As shown in FIG. 4 and FIG. 5, the base structure 110 of the wrist rest 100 may further include at least one switch 117. The switch 117 may be operable to receive an input from the user to control the plurality of light sources 120. In some embodiments, the switch 117 may include a plurality of switches, for example, a first switch 117a and a second switch 117b. The first switch 117a and the second switch 117b may be disposed on one of the side walls 111 of the base structure 110. For example, the first switch 117a and the second switch 117b may be disposed on the same side wall where the port 115 is disposed. For example, the first switch 117a and the second switch 117b may be disposed adjacent to the port 115. While FIG. 4 and FIG. 5 show the first switch 117a and the second switch 117b being disposed on the one of the side walls 111 of the base structure 110, it may be appreciated that the first switch 117a and the second switch 117b may be provided on any other of the side walls 111 of the base structure 110.

The first switch 117a may be operable to selectively power on and power off the plurality of light sources 120. For example, as shown in FIG. 4 and FIG. 5, the first switch 117a may be a toggle switch which may be actuated with a knob or a lever to select powering on or off. While FIG. 4 and FIG. 5 show the first switch 117a being the toggle switch, it may be appreciated that the first switch 117a may be any other types of switches.

The second switch 117b may be operable to trigger switching between a plurality of lighting profiles to control each light source 120 to produce at least one predetermined lighting colour respectively based on one of the plurality of lighting profiles selected by the switching. For example, as shown in FIG. 4 and FIG. 5, the second switch 117b may be a push-button switch. As an example, when the user presses the second switch 117b, the lighting profile may be changed to another lighting profile, and each light source 120 may produce the at least one predetermined lighting colour respectively based on the changed lighting profile. While FIG. 4 and FIG. 5 show the second switch 117b being the push-button switch, it may be appreciated that the second switch 117b may be any other types of switches.

Although not shown in FIG. 4 and FIG. 5, in some other embodiments, a single switch 117 may be provided to selectively power on, power off, and change the lighting profile. For example, the single switch 117 may be a three-way toggle switch or a four-way toggle switch.

In some embodiments, the wrist rest 100 may further include a memory (not shown) operable to permanently or temporarily store the information about the lighting profile. As shown in FIG. 4 and FIG. 5, the base structure 110 of the wrist rest 100 may further include a button 118 operable to reset the memory and/or reinitialise the wrist rest 100 from an unknown state. The button 118 may be located in a hole such that the user may press the button 118 by inserting a pointed and thin tool such as a pin or a clip. In some embodiments, when the user presses the button 118, information about communication connection mode (for example, RF and/or Bluetooth connection) set by the user may be deleted from the memory and the communication connection mode may be reset to a default mode (also referred to as "factory reset"). In the event that the communication connection has an issue, the user may press the button 118 to reset the communication connection mode to the default mode. In some embodiments, when the user presses the button 118, the memory may be reset and the information about the lighting profile may be deleted from the memory. For example, the button 118 may be disposed on one of the side walls 111 of the base structure 110, for example on the same side wall where the switch 117 is disposed. While FIG. 4 and FIG. 5 show the button 118 being disposed on the one of the side walls 111 of the base structure 110, it may be appreciated that the button 118 may be provided on any other of the side walls 111 of the base structure 110.

Figure 6:
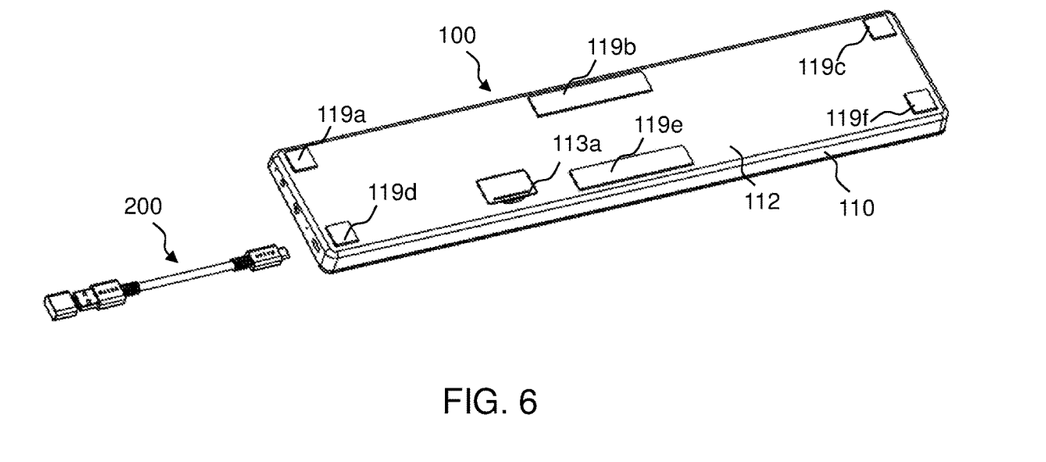
FIG. 6 shows a schematic diagram of a rear perspective view of the wrist rest according to various embodiments.
Figure 7:
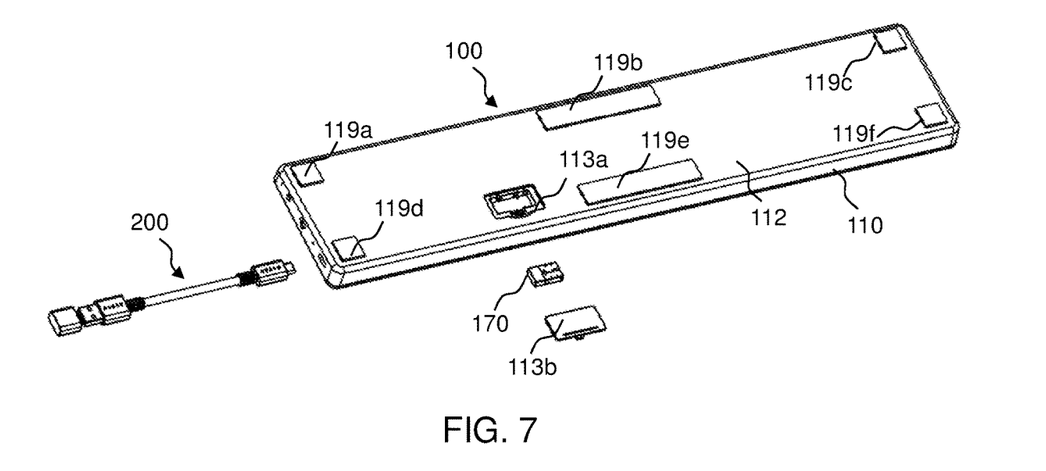
FIG. 7 shows another schematic diagram of a rear perspective view of the wrist rest according to various embodiments.

FIG. 6 shows a schematic diagram of a rear perspective view of the wrist rest 100 according to various embodiments. FIG. 7 shows another schematic diagram of a rear perspective view of the wrist rest 100 according to various embodiments.

As shown in FIG. 6 and FIG. 7, the base structure 110 of the wrist rest 100 may further include a slot 113a to house the communication device 170. In some embodiments, the slot 113a may be disposed at the bottom side 112 of the base structure 110. The base structure 100 may further include a detachable door flap 113b configured to cover the slot 113a. Although not shown in FIG. 6 and FIG. 7, in some other embodiments, the slot 113a may be disposed at one of the side walls 111 of the base structure 110 to house the communication device 170, and the base structure 100 may further include the detachable door flap 113b configured to cover the slot 113a disposed at the side wall 111.

As shown in FIG. 6 and FIG. 7, the base structure 110 of the wrist rest 100 may further include one or more pads 119a, 119b, 119c, 119d, 119e, 119f. The pads 119a, 119b, 119c, 119d, 119e, 119f may be attached to the bottom side 112 of the base structure using an adhesive or a glue. The pads 119a, 119b, 119c, 119d, 119e, 119f may prevent the wrist rest 100 from sliding on a surface by increasing friction between the wrist rest 100 and the surface. For example, the pads 119a, 119b, 119c, 119d, 119e, 119f may be made of rubber or silicone. As shown in FIG. 6 and FIG. 7, as an example, six (6) pads 119a, 119b, 119c, 119d, 119e, 119f may be provided. While FIG. 6 and FIG. 7 show six (6) pads 119a, 119b, 119c, 119d, 119e, 119f attached to the bottom side 112 of the base structure 110, it may be appreciated that the number of pads may be varied, for example, based on the size of the wrist rest 100.

FIG. 8 shows a block diagram of a system 1000 comprising a wrist rest 100 and an electronic device 300 according to various embodiments. According to various embodiments, the wrist rest 100 may be configured in accordance with one or more (e.g., all) of the embodiments described in connection with FIGS. 1 to 7 and/or may contain some or all of the features of the wrist rest 100 described in connection with FIGS. 1 to 7. Accordingly, all features, changes, modifications, and variations which are applicable to the wrist rest 100 of FIGS. 1 to 7 may also be applicable to the wrist rest 100 of FIG. 8. According to various embodiments, the wrist rest 100 of FIG. 8 may include the following additional features and/or limitations. According to various embodiments, the system 1000 is for controlling the wrist rest 100 to produce a plurality of lighting colours, for example, based on a predetermined lighting profile.

As described above, the wrist rest 100 may comprise the plurality of light sources 120, the communication module 160 and the battery 180. The wrist rest 100 may further comprise the controller 121. The wrist rest 100 may further comprise the communication device 170. The electronic device 300 may include at least one of the mobile phone, the tablet computer, the laptop computer, the desktop computer, the head-mounted display and the smart watch.

The communication device 170 of the wrist rest 100 may be detachably couplable to the electronic device 300. In some embodiments, the communication device 170 may be detachably couplable to the port of the electronic device 300. The communication device 170 may be operable to communicatively connect the communication module 160 with the electronic device 300 through a wireless network.

The communication module 160 of the wrist rest 100 may be operable to receive the wireless signal comprising the information about the lighting profile from the electronic device 300 through the wireless network. The communication module 160 may then provide the information about the lighting profile to the controller 121.

The controller 121 may receive the information about the lighting profile from the communication module 160. The controller 121 may then control each light source 120 to produce at least one predetermined lighting colour among the plurality of lighting colours based on said lighting profile. For example, the controller 121 may be one or more LED drivers 121.

The battery 180 may be operable to supply power to the plurality of light sources 120. For example, the battery 180 may supply the power to the plurality of light sources 120 via the controller 121, for example the LED drivers. The battery 180 may be operable to supply power to the communication module 160.

As described above, although not shown in FIG. 8, the wrist rest 100 may further comprise the switch 117, for example, the first switch 117a and the second switch 117b.

The first switch 117a may be operable to selectively power on and power off the plurality of light sources 120. For example, when the user toggles the first switch 117a to turn on the wrist rest 100, the battery 180 may power the plurality of light sources 120 and the communication module 160. The controller 121, for example, the LED drivers, may then control each light source 120 to produce at least one predetermined lighting colour respectively based on the predetermined lighting profile (hereinafter referred to as "a first lighting profile"), as a default lighting profile. The first lighting profile may be a dynamic lighting profile, in which colours of at least some (e.g., all) of the light sources 120 may (e.g., continuously) change over time. For example, the controller 121, for example, the LED drivers, may control each light source 120 to change the lighting colour over time according to the first lighting profile. Therefore, each light source 120 may (e.g., continuously) change its lighting colour according to the first lighting profile during a predetermined time period. In some embodiments, the predetermined time period may, for example, be a predetermined number of seconds, a predetermined number of minutes, or a predetermined number of hours. In some other embodiments, the predetermined time period may be unlimited time until the first switch 117a or the second switch 117b of the wrist rest 100 receives a further input from the user. When the user toggles the first switch 117a to turn off the wrist rest 100, the battery 180 may stop powering the plurality of light sources 120 and the communication module 160.

The second switch 117b may be operable to trigger switching between a plurality of lighting profiles to control each light source 120 to produce at least one predetermined lighting colour respectively based on one of the plurality of lighting profiles selected by the switching.

In some embodiments, the plurality of lighting profiles may include the first lighting profile and a second lighting profile which is different from the first lighting profile. For example, when the user presses the second switch 117b while each light source 120 (e.g., continuously) changes its lighting colour according to the first lighting profile, the controller 121, for example, the LED drivers, may control each light source 120 to change its lighting colour over time according to the second lighting profile. Thereafter, when the user presses the second switch 117b while each light source 120 (e.g., continuously) changes its lighting colour according to the second lighting profile, the controller 121, for example, the LED drivers, may control each light source 120 to change its lighting colour over time according to the first lighting profile.

While the above example describes two (2) predetermined lighting profiles, it may be appreciated that the number of the predetermined lighting profiles may be more than two (2). In some other embodiments, the number of the predetermined lighting profiles may be one (1). For example, when the user presses the second switch 117b while each light source 120 (e.g., continuously) changes its lighting colour according to the first lighting profile, the controller 121, for example, the LED drivers, may control each light source 120 to re-start producing and changing its lighting colour according to the first lighting profile.

In some embodiments, when the second switch 117b is triggered to switch to the second lighting profile from the first lighting profile, the communication module 160 of the wrist rest 100 may be operable to transmit a switching signal to the electronic device 300. The electronic device 300 may be operable to transmit a signal comprising information about the second lighting profile to the communication module 160 of the wrist rest 100. The communication module 160 may then control each light source 120 to change the lighting colour according to the second lighting profile. In some other embodiments, the wrist rest 100 may further comprise the memory (not shown) operable to permanently or temporarily store the information about the plurality of lighting profiles. When the second switch 117b is triggered to switch to the second lighting profile from the first lighting profile, the controller 121, for example, the LED drivers, is operable to control each light source 120 to change the lighting colour according to the second lighting profile saved in the memory.

In some embodiments, the electronic device 300 may be operable to update the lighting profile. The electronic device 300 may provide the wrist rest 100 with information about the updated lighting profile. For example, the lighting profile may include, but not be limited to, multiple LED matrix patterns, an audiometer pattern, and an emoticon pattern.

The user may connect the wrist rest 100 to the electronic device 300, and create or modify one or more lighting profiles for the wrist rest 100. In this manner, the user may personalize the lighting profile. The user may download the lighting profile from a server to the electronic device 300. Therefore, the wrist rest 100 according to various embodiments may provide an affordable option to create the lighting profiles and implement the created lighting profiles.

In some embodiments, the keyboard connected to the wrist rest 100 directly or indirectly (for example, via the same motherboard) may be synchronised with the lighting profile. For example, the keyboard and the wrist rest 100 according to various embodiments may simultaneously produce the light in accordance with the lighting profile.

In some embodiments, the wrist rest 100 according to various embodiments may not have an internal battery. The wrist rest 100 may draw power from an external device, for example, the keyboard, via an electrical connector, for example, a pogo pin. By way of example, the keyboard is able to supply the power to the wrist rest 100 through one or more pogo pins and optionally be synchronised with the lighting profile.

The following examples pertain to further embodiments.

Example 1 is a wrist rest including: a base structure: a plurality of light sources housed in the base structure and capable of emitting light: a light guide disposed over the plurality of light sources, and configured to receive the light emitted from the plurality of light sources and release the light; and a cushion secured to the base structure and disposed over the light guide in a manner so as to conceal the plurality of light sources and the light guide between the base structure and the cushion, wherein the cushion is configured to diffuse the light released from the light guide, and wherein each light source is capable of selectively producing a plurality of lighting colours.

In example 2, the subject-matter of example 1 may further include that the cushion is formed of translucent soft gel.

In example 3, the subject-matter of example 1 or example 2 may further include: a controller operable to control each light source to produce at least one predetermined lighting colour among the plurality of lighting colours based on a predetermined lighting profile.

In example 4, the subject-matter of example 3 may further include: a communication module operable to receive a wireless signal including information about the lighting profile and provide the information to the controller.

In example 5, the subject-matter of example 4 may further include: a communication device configured to be detachably couplable to an external electronic device, and operable to communicatively connect the communication module with the electronic device through a network.

In example 6, the subject-matter of example 5 may further include that the base structure further includes a slot disposed at a bottom side of the base structure to house the communication device.

In example 7, the subject-matter of example 6 may further include that the base structure further includes a detachable door flap configured to cover the slot.

In example 8, the subject-matter of any one of examples 1 to 7 may further include that the plurality of light sources includes a plurality of RGB LEDs (red-green-blue light emitting diodes).

In example 9, the subject-matter of example 8 may further include: a circuit board housed in the base structure, and wherein the RGB LEDs are mounted on the circuit board.

In example 10, the subject-matter of example 9 may further include: a battery housed in the base structure and operable to supply power to the plurality of light sources.

In example 11, the subject-matter of example 10 may further include that the circuit board includes a cut-out, and the battery is configured to be inserted into the cut-out to connect the battery to the circuit board.

In example 12, the subject-matter of any one of examples 1 to 11 may further include: a port arranged on a side wall of the base structure and configured to allow a power cable to be plugged therein to receive power from an external power source.

In example 13, the subject-matter of any one of examples 1 to 12 may further include: at least one switch operable to receive an input from a user to control the plurality of light sources.

In example 14, the subject-matter of example 13 may further include that the switch includes a first switch operable to power on and off the plurality of light sources.

In example 15, the subject-matter of example 13 or example 14 may further include that the switch includes a second switch operable to trigger switching between a plurality of lighting profiles to control each light source to produce at least one predetermined lighting colour respectively based on one of the plurality of lighting profiles selected by the switching.

Example 16 is a system including a wrist rest and an electronic device. The wrist rest includes: a base structure: a plurality of light sources housed in the base structure and capable of emitting light: a light guide disposed over the plurality of light sources, and configured to receive the light emitted from the plurality of light sources and release the light; and a cushion secured to the base structure and disposed over the light guide in a manner so as to conceal the plurality of light sources and the light guide between the base structure and the cushion, wherein the cushion is configured to diffuse the light released from the light guide. The electronic device is capable of communicating with the wrist rest and operable to transmit a wireless signal including information about a lighting profile to the wrist rest. Each light source is capable of selectively producing a plurality of lighting colours.

In example 17, the subject-matter of example 16 may further include that the cushion is formed of translucent soft gel.

In example 18, the subject-matter of example 16 or example 17 may further include that the wrist rest further includes a controller operable to control each light source to produce at least one predetermined lighting colour among the plurality of lighting colours based on the lighting profile according to the signal received from the electronic device.

In example 19, the subject-matter of example 18 may further include that the wrist rest further includes a communication module operable to receive the signal including the information about the lighting profile and provide the information to the controller.

In example 20, the subject-matter of example 19 may further include that the wrist rest further includes a communication device configured to be detachably couplable to the electronic device, and operable to communicatively connect the communication module with the electronic device through a network.

In example 21, the subject-matter of example 20 may further include that the base structure further includes a slot disposed at a bottom side of the base structure to house the communication device.

In example 22, the subject-matter of example 21 may further include that the base structure further includes a detachable door flap configured to cover the slot.

In example 23, the subject-matter of any one of examples 16 to 22 may further include that the plurality of light sources includes a plurality of RGB LEDs (red-green-blue light emitting diodes).

In example 24, the subject-matter of example 23 may further include that the wrist rest further includes a circuit board housed in the base structure, and wherein the RGB LEDs are mounted on the circuit board.

In example 25, the subject-matter of example 24 may further include that the wrist rest further includes a battery housed in the base structure and operable to supply power to the plurality of light sources.

In example 26, the subject-matter of example 25 may further include that the circuit board includes a cut-out, and the battery is configured to be inserted into the cut-out to connect the battery to the circuit board.

In example 27, the subject-matter of any one of examples 16 to 26 may further include that the wrist rest further includes a port arranged on a side wall of the base structure and configured to allow a power cable to be plugged therein to receive power from an external power source or the electronic device.

In example 28, the subject-matter of any one of examples 16 to 27 may further include that the wrist rest further includes at least one switch operable to receive an input from a user to control the plurality of light sources.

In example 29, the subject-matter of example 28 may further include that the switch includes a first switch operable to power on and off the plurality of light sources.

In example 30, the subject-matter of example 28 or example 29 may further include that the switch includes a second switch operable to trigger switching between a plurality of lighting profiles to control each light source to produce at least one predetermined lighting colour respectively based on one of the plurality of lighting profiles selected by the switching.

In example 31, the subject-matter of example 30 may further include that when the second switch is triggered to switch to a different lighting profile, the wrist rest is operable to transmit a switching signal to the electronic device, and the electronic device is operable to transmit a signal including information about said lighting profile to the wrist rest.

In example 32, the subject-matter of example 30 may further include that the wrist rest further includes a memory, and when the second switch is triggered to switch to a different lighting profile, the controller is operable to control each light source to produce at least one predetermined lighting colour respectively based on information about said lighting profile saved in the memory.

In example 33, the subject-matter of any one of examples 16 to 32 may further include that the electronic device is operable to update the lighting profile and provide the wrist rest with information about the updated lighting profile.

In example 34, the subject-matter of any one of examples 16 to 33 may further include that the electronic device includes at least one of the following: a mobile phone, a tablet computer, a laptop computer, a desktop computer, a head-mounted display and a smart watch.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The invention claimed is:

1. A wrist rest comprising:
   a base structure;
   a plurality of light sources housed in the base structure and capable of emitting light;
   a light guide disposed over the plurality of light sources, and configured to receive the light emitted from the plurality of light sources and release the light, wherein each light source is capable of selectively producing a plurality of lighting colours, wherein the plurality of light sources includes a plurality of RGB LEDs (red-green-blue light emitting diodes);
   a cushion secured to the base structure and disposed over the light guide in a manner so as to conceal the plurality of light sources and the light guide between the base structure and the cushion, wherein the cushion is configured to diffuse the light released from the light guide;
   a circuit board housed in the base structure, wherein the RGB LEDs are mounted on the circuit board; and
   a battery housed in the base structure and operable to supply power to the plurality of light sources,
   wherein the circuit board comprises a cut-out, and the battery is configured to be inserted into the cut-out to connect the battery to the circuit board.

2. The wrist rest according to claim 1, wherein the cushion is formed of translucent soft gel.

3. The wrist rest according to claim 1, further comprising a controller operable to control each light source to produce at least one predetermined lighting colour among the plurality of lighting colours based on a predetermined lighting profile.

4. The wrist rest according to claim 3, further comprising a communication module operable to receive a wireless signal comprising information about the lighting profile and provide the information to the controller,
   further comprising a communication device configured to be detachably couplable to an external electronic device, and operable to communicatively connect the communication module with the electronic device through a network,
   wherein the base structure further comprises a slot disposed at a bottom side of the base structure to house the communication device,
   wherein the base structure further comprises a detachable door flap configured to cover the slot.

5. The wrist rest according to claim 1, further comprising a port disposed on a side wall of the base structure and configured to allow a power cable to be plugged therein to receive power from an external power source.

6. The wrist rest according to claim 1, further comprising at least one switch operable to receive an input from a user to control the plurality of light sources.

7. The wrist rest according to claim 6, wherein the switch includes a first switch operable to power on and off the plurality of light sources, preferably wherein the switch includes a second switch operable to trigger switching between a plurality of lighting
   profiles to control each light source to produce at least one predetermined lighting colour respectively based on one of the plurality of lighting profiles selected by the switching.

8. A system, comprising:
a wrist rest comprising:
a base structure;
a plurality of light sources housed in the base structure and capable of emitting light, wherein each light source is capable of selectively producing a plurality of lighting colours, wherein the plurality of light sources includes a plurality of RGB LEDs (red-green-blue light emitting diodes);
a light guide disposed over the plurality of light sources, and configured to receive the light emitted from the plurality of light sources and release the light; and
a cushion secured to the base structure and disposed over the light guide in a manner so as to conceal the plurality of light sources and the light guide between the base structure and the cushion, wherein the cushion is configured to diffuse the light released from the light guide; and
an electronic device capable of communicating with the wrist rest and operable to transmit a wireless signal comprising information about a lighting profile to the wrist rest;
a circuit board housed in the base structure, wherein the RGB LEDs are mounted on the circuit board; and
a battery housed in the base structure and operable to supply power to the plurality of light sources, wherein the circuit board comprises a cut-out, and the battery is configured to be inserted into the cut-out to connect the battery to the circuit board.

9. The system according to claim 8, wherein the cushion is formed of translucent soft gel.

10. The system according to claim 8, wherein the wrist rest further comprises a controller operable to control each light source to produce at least one predetermined lighting colour among the plurality of lighting colours based on the lighting profile according to the signal received from the electronic device.

11. The system according to claim 10, wherein the wrist rest further comprises a communication module operable to receive the signal comprising the information about the lighting profile and provide the information to the controller,
wherein the wrist rest further comprises a communication device configured to be detachably couplable to the electronic device, and operable to communicatively connect the communication module with the electronic device through a network,
wherein the base structure further comprises a slot disposed at a bottom side of the base structure to house the communication device,
wherein the base structure further comprises a detachable door flap configured to cover the slot.

12. The system according to claim 8, wherein the wrist rest further comprises a port disposed on a side wall of the base structure and configured to allow a power cable to be plugged therein to receive power from an external power source or the electronic device.

13. The system according to claim 8, wherein the wrist rest further comprises at least one switch operable to receive an input from a user to control the plurality of light sources.

14. The system according to claim 13, wherein the switch includes a first switch operable to power on and off the plurality of light sources.

15. The system according to claim 13, wherein the switch includes a second switch operable to trigger switching between a plurality of lighting profiles to control each light source to produce at least one predetermined lighting colour respectively based on one of the plurality of lighting profiles selected by the switching.

16. The system according to claim 15, wherein when the second switch is triggered to switch to a different lighting profile, the wrist rest is operable to transmit a switching signal to the electronic device, and the electronic device is operable to transmit a signal comprising information about said lighting profile to the wrist rest, and/or wherein the wrist rest further comprises a memory, and when the second switch is triggered to switch to a different lighting profile, a controller is operable to control each light source to produce at least one predetermined lighting colour respectively based on information about said lighting profile saved in the memory.

17. The system according to claim 8, wherein the electronic device is operable to update the lighting profile and provide the wrist rest with information about the updated lighting profile.

18. The system according to claim 8, wherein the electronic device includes at least one of the following: a mobile phone, a tablet computer, a laptop computer, a desktop computer, a head-mounted display and a smart watch.

* * * * *